(12) United States Patent
Okada (10) Patent No.: US 9,876,978 B2
(45) Date of Patent: Jan. 23, 2018

(54) IMAGING ELEMENT, GAIN CONTROL METHOD, PROGRAM, AND ELECTRONIC DEVICE

(71) Applicant: SONY CORPORATION, Tokyo (JP)

(72) Inventor: Chihiro Okada, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/302,258

(22) PCT Filed: Apr. 3, 2015

(86) PCT No.: PCT/JP2015/060553
§ 371 (c)(1),
(2) Date: Oct. 6, 2016

(87) PCT Pub. No.: WO2015/159730
PCT Pub. Date: Oct. 22, 2015

(65) Prior Publication Data
US 2017/0034467 A1 Feb. 2, 2017

(30) Foreign Application Priority Data
Apr. 16, 2014 (JP) .................. 2014-084289

(51) Int. Cl.
*H04N 5/378* (2011.01)
*H04N 5/235* (2006.01)

(52) U.S. Cl.
CPC ........... *H04N 5/378* (2013.01); *H04N 5/2351* (2013.01); *H04N 5/2355* (2013.01)

(58) Field of Classification Search
CPC .... H04N 5/378; H04N 5/2351; H04N 5/2355; H04N 5/3745; H04N 5/37455;
(Continued)

(56) References Cited

U.S. PATENT DOCUMENTS 8,653,435 B2 * 2/2014 Eldesouki ............... G01J 1/46
250/208.1
8,773,544 B2 * 7/2014 Koh ................... H04N 5/23245
341/169
(Continued)

FOREIGN PATENT DOCUMENTS

JP 2005-328135 11/2005
JP 2007-059991 3/2007
(Continued)

OTHER PUBLICATIONS

International Search Report prepared by the Japan Patent Office dated Jun. 2, 2015, for International Application No. PCT/JP2015/060553.

*Primary Examiner* — Pritham Prabhakher
(74) *Attorney, Agent, or Firm* — Sheridan Ross P.C.

(57) ABSTRACT

The present disclosure relates to an imaging element, a gain control method, a program, and an electronic device that can capture an image with a high image quality or a high dynamic range with lower power consumption. The imaging element includes: an A/D conversion unit configured to A/D-convert a pixel signal outputted from a pixel; and a reference signal generation unit. The reference signal generation unit includes a prescribed number of pairs of transistors forming a current mirror circuit, and a switching unit configured to switch the number of transistors connected to the current mirror circuit. The switching unit is controlled so as to reduce the number of transistors connected to the current mirror circuit when the pixel signal is A/D-converted to a high gain. The present technology can be applied to a CMOS image sensor, for example.

5 Claims, 7 Drawing Sheets

(58) Field of Classification Search
CPC ......... G09G 3/3241; H03F 2203/21127; H03F 2203/21148; H03F 2203/21184; H03F 2203/30006; H03F 2203/30061; H03F 2203/45011; H03F 2203/45096
USPC ........................................................ 348/300
See application file for complete search history.

(56) References Cited

U.S. PATENT DOCUMENTS

| | | | | |
|---|---|---|---|---|
| 8,785,872 | B1* | 7/2014 | Roos | H04N 5/32 250/370.09 |
| 9,344,627 | B2* | 5/2016 | Yoo | H04N 5/23245 |
| 2011/0279718 | A1* | 11/2011 | Yoo | H03F 3/45188 348/300 |
| 2012/0140089 | A1* | 6/2012 | Koh | H04N 5/23245 348/220.1 |
| 2013/0087688 | A1* | 4/2013 | Saito | H03K 3/0231 250/208.1 |
| 2013/0248689 | A1* | 9/2013 | Eldesouki | G01J 1/46 250/208.1 |
| 2014/0232890 | A1* | 8/2014 | Yoo | H04N 5/378 348/220.1 |

FOREIGN PATENT DOCUMENTS

| | | |
|---|---|---|
| JP | 2008-312179 A | 12/2008 |
| JP | 2009-38772 A | 2/2009 |

* cited by examiner

IMAGING ELEMENT, GAIN CONTROL METHOD, PROGRAM, AND ELECTRONIC DEVICE

CROSS REFERENCE TO RELATED APPLICATIONS

This application is a national stage application under 35 U.S.C. 371 and claims the benefit of PCT Application No. PCT/JP2015/060553 having an international filing date of 3 Apr. 2015, which designated the United States, which PCT application claimed the benefit of Japanese Patent Application No. 2014-084289 filed 16 Apr. 2014, the disclosures of which are incorporated herein by reference in their entirety.

TECHNICAL FIELD

The present disclosure relates to an imaging element, a gain control method, a program, and an electronic device, and relates particularly to an imaging element, a gain control method, a program, and an electronic device that can capture an image with a high image quality or a high dynamic range with lower power consumption.

BACKGROUND ART

Conventionally, in an electronic device having an imaging function such as a digital still camera or a digital video camera, for example, a solid state imaging element such as a charge-coupled device (CCD) or complementary metal oxide semiconductor (CMOS) image sensor is used. The solid state imaging element includes a pixel in which a photodiode (PD) that performs photoelectric conversion and a plurality of transistors are combined, and an image is constructed on the basis of pixel signals outputted from a plurality of pixels arranged in a planar way. The pixel signals outputted from the pixels are, for example, A/D-converted by a plurality of analog-to-digital (A/D) converters arranged individually for columns of pixels, and are outputted.

For example, in Patent Literature 1, a solid state imaging element including an A/D converter configured to include a comparator that compares a saw wave-like ramp signal and a pixel signal and a counter is disclosed. Further, in Patent Literature 2, a solid state imaging element in which, in an A/D conversion system called a single-slope integration type, gain adjustment can be made by changing the slope of a reference signal supplied to a comparison circuit is disclosed.

CITATION LIST

Patent Literature

Patent Literature 1: JP 2005-328135A
Patent Literature 2: JP 2007-59991A

SUMMARY OF INVENTION

Technical Problem

In order to capture an image with a high image quality or a high dynamic range in the solid state imaging element including a single-slope integration A/D converter, it is necessary to expand the gain or make the waveform of the ramp signal have a high amplitude. In order to achieve a wide gain or a high amplitude of the waveform of the ramp signal, it is necessary to include a wide range in which the amount of current used to generate the ramp signal can change, and conventionally a method of changing the amount of current flowing per constant current source has been used.

However, in such a method, it is difficult to expand the range in which the amount of current can change hence, it is necessary to increase the power supply voltage, and this has led to an increase in power consumption. Thus, a solid state imaging element that can capture an image with a high image quality or a high dynamic range while avoiding such an increase in power consumption has been desired.

The present disclosure has been made in view of such circumstances, and makes it possible to capture an image with a high image quality or a high dynamic range with lower power consumption.

Solution to Problem

According to an aspect of the present disclosure, there is provided an imaging element including: an A/D conversion unit configured to A/D-convert a pixel signal outputted from a pixel; and a reference signal generation unit configured to generate a reference signal that is referred to when the pixel signal is A/D-converted in the A/D conversion unit. The reference signal generation unit includes a prescribed number of pairs of transistors forming a current mirror circuit, and a switching unit configured to switch the number of transistors connected to the current mirror circuit.

According to an aspect of the present disclosure, there is provided a gain control method or a program for an imaging element, the imaging element including an A/D conversion unit configured to A/D-convert a pixel signal outputted from a pixel, and a reference signal generation unit configured to generate a reference signal that is referred to when the pixel signal is A/D-converted in the A/D conversion unit, the reference signal generation unit including a prescribed number of pairs of transistors forming a current mirror circuit, and a switching unit configured to switch the number of transistors connected to the current mirror circuit, the gain control method or the program including: a step of acquiring a brightness of a captured image; and a step of controlling the switching unit so as to reduce the number of transistors connected to the current mirror circuit at a time of, on the basis of the brightness of the image, setting a gain at a time when the pixel signal is A/D-converted by the A/D conversion unit to a high gain.

According to an aspect of the present disclosure, there is provided an electronic device including an imaging element, the imaging element including an A/D conversion unit configured to A/D-convert a pixel signal outputted from a pixel, and a reference signal generation unit configured to generate a reference signal that is referred to when the pixel signal is A/D-converted in the A/D conversion unit, the reference signal generation unit including a prescribed number of pairs of transistors forming a current mirror circuit, and a switching unit configured to switch the number of transistors connected to the current mirror circuit.

In an aspect of the present disclosure, an imaging element includes an A/D conversion unit configured to A/D-convert a pixel signal outputted from a pixel, and a reference signal generation unit configured to generate a reference signal that is referred to when the pixel signal is A/D-converted in the A/D conversion unit, and the reference signal generation unit includes a prescribed number of pairs of transistors forming a current mirror circuit, and a switching unit configured to switch the number of transistors connected to the current mirror circuit. A brightness of a captured image is acquired, and the switching unit is controlled so as to reduce the number of transistors connected to the current mirror circuit at a time of, on the basis of the brightness of the image, setting a gain at a time when the pixel signal is A/D-converted by the A/D conversion unit to a high gain.

Advantageous Effects of Invention

According to an aspect of the present disclosure, an image with a high image quality or a high dynamic range can be captured with lower power consumption.

DESCRIPTION OF EMBODIMENT(S)

Hereinbelow, specific embodiments to which the present technology is applied are described in detail with reference to the drawings.

Figure 1:
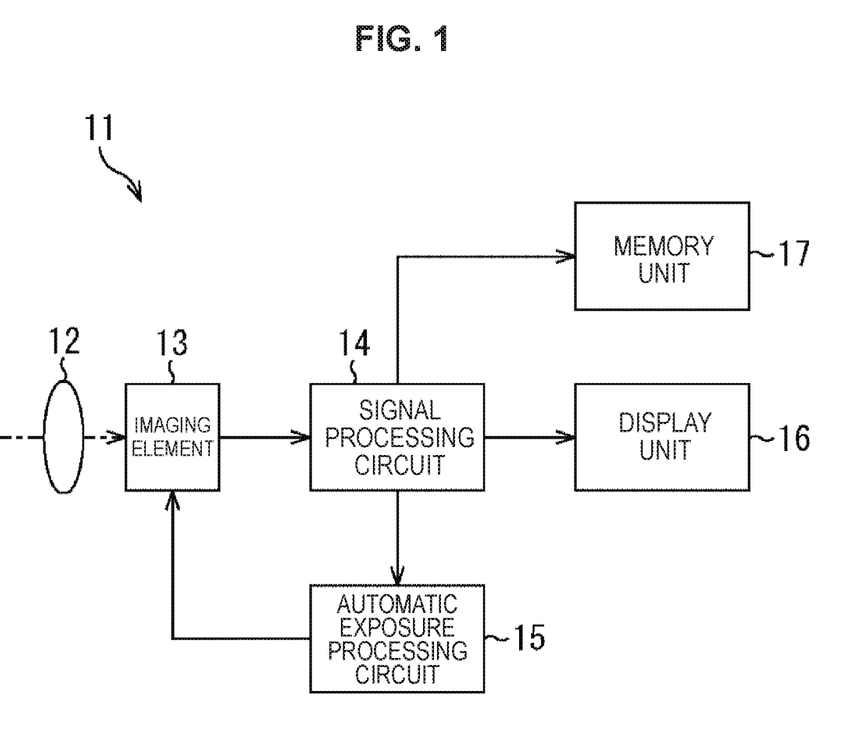
FIG. 1 is a block diagram showing an example of the configuration of an embodiment of an imaging device to which the present technology is applied.

FIG. 1 is a block diagram showing an example of the configuration of an embodiment of an imaging device that is an example of the electronic device to which the present technology is applied.

As shown in FIG. 1, an imaging device 11 is configured to include an optical system 12, an imaging element 13, a signal processing circuit 14, an automatic exposure processing circuit 15, a display unit 16, and a memory unit 17. The imaging device 11 is, for example, an electronic device capable of capturing still images and moving images, such as a digital still camera or a digital video camera.

The optical system 12 is configured to include one or a plurality of lenses, and guides image light from a subject (incident light) to the imaging element 13 to form an image on the light receiving surface of the imaging element 13.

The imaging element 13 includes a plurality of pixels arranged in a matrix configuration on the light receiving surface that receives light collected by the optical system 12, and supplies a pixel signal in accordance with the amount of light received by each pixel to the signal processing circuit 14. The configuration of the imaging element 13 will be described later with reference to FIG. 2.

The signal processing circuit 14 performs various signal processings such as white balance adjustment and gamma correction on a pixel signal supplied from the imaging element 13 to construct an image (image data) based on the pixel signal, and supplies the image to the automatic exposure processing circuit 15, the display unit 16, and the memory unit 17.

The automatic exposure processing circuit 15 performs automatic exposure processing in which the brightness of an image captured by the imaging element 13 is detected and the brightness of the image is adjusted automatically so as to obtain an appropriate brightness in accordance with an exposure value inputted by the user using, for example, a not-shown input unit. For example, the automatic exposure processing circuit 15 finds the average value of all the pixel signals outputted from the imaging element 13 to detect the brightness of the image (hereinafter, referred to as a sensor output level as appropriate), and supplies the sensor output level to the imaging element 13. Thereby, in the imaging element 13, the brightness of the image is adjusted in accordance with the sensor output level.

The display unit 16 is formed of, for example, a liquid crystal panel, an organic electro-luminescence (EL) panel, or the like, and displays an image supplied from the signal processing circuit 14.

The memory unit 17 is formed of, for example, a non-volatile memory installed in the imaging device 11, a removable medium attachable to and detachable from the imaging device 11, or the like, and stores an image (image data) supplied from the signal processing circuit 14.

In the imaging device 11 thus configured, an image captured by the imaging element 13 is displayed on the display unit 16; and when a not-shown shutter button is manipulated, an image captured at this timing is stored in the memory unit 17. The brightness of the image captured by the imaging element 13 is controlled by the automatic exposure processing circuit 15.

Figure 2:
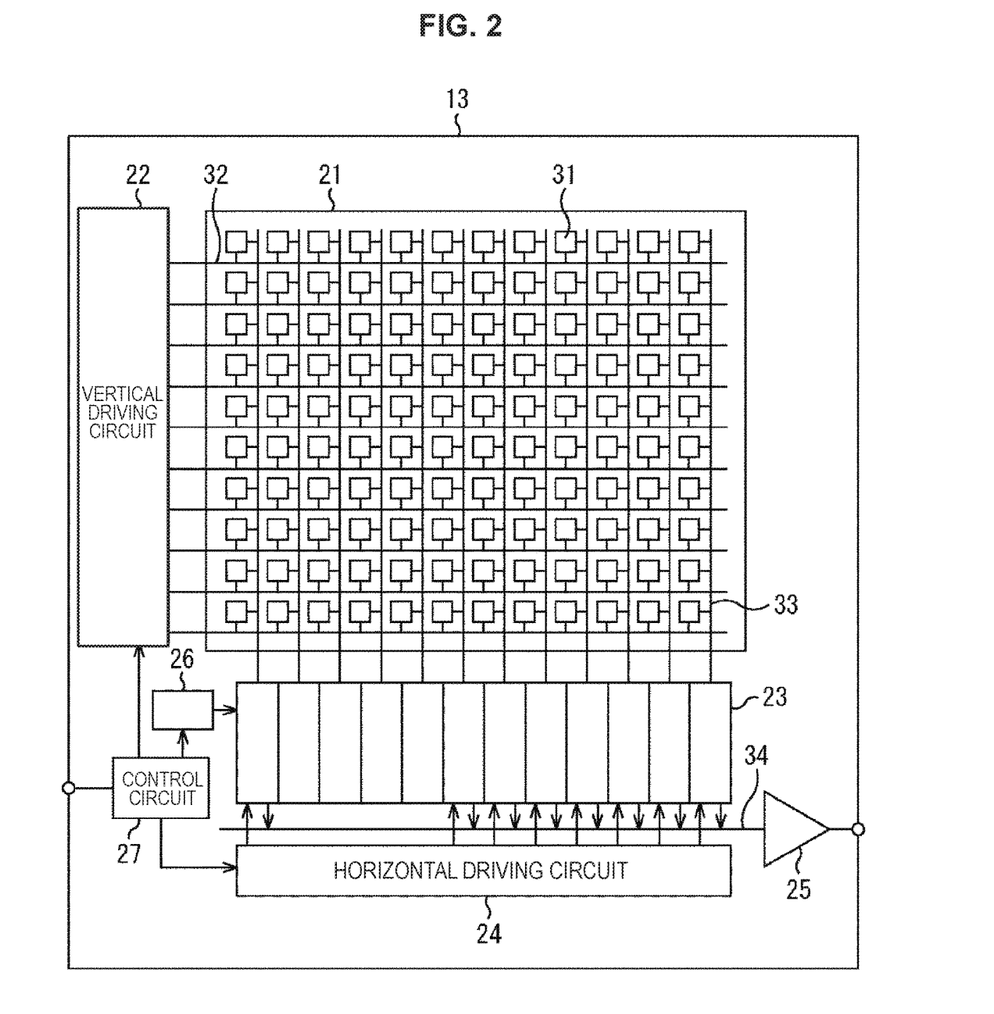
FIG. 2 is a diagram showing an example of the configuration of an imaging element.

Next, in FIG. 2, an example of the configuration of the imaging element 13 is shown.

As shown in FIG. 2, the imaging element 13 is configured to include a pixel area 21, a vertical driving circuit 22, a column signal processing circuit 23, a horizontal driving circuit 24, an output circuit 25, a ramp signal generation circuit 26, and a control circuit 27.

The pixel area 21 is a light receiving surface that receives light collected by the optical system 12 of FIG. 1. A plurality of pixels 31 are arranged in a matrix configuration in the pixel area 21, and each pixel 31 is connected to the vertical driving circuit 22 via a horizontal signal line 32 on a row basis and to the column signal processing circuit 23 via a vertical signal line 33 on a column basis. Each of the plurality of pixels 31 outputs a pixel signal at a level in accordance with the amount of light received by itself, and an image of the subject formed in the pixel area 21 is constructed from the pixel signals.

The vertical driving circuit 22 supplies, to the pixel 31 via the horizontal signal line 32, a driving signal for driving (transferring, selecting, resetting, etc.) each pixel 31 on a row basis of the plurality of pixels 31 arranged in the pixel area 21.

The column signal processing circuit 23 performs correlated double sampling (CDS) processing on pixel signals outputted from the plurality of pixels 31 via the vertical signal lines 33, and thereby performs the A/D conversion of the pixel signals and removes the reset noise. For example, the column signal processing circuit 23 is configured to include a plurality of column processing units 41 (see FIG. 3 described later) in accordance with the number of columns of pixels 31, and is capable of performing CDS processing on a column basis of pixels 31 in parallel.

The horizontal driving circuit 24 supplies, to the column signal processing circuit 23, a driving signal for causing a pixel signal to be outputted from the column signal processing circuit 23 to a data output signal line 34 on a column basis of the plurality of pixels 31 arranged in the pixel area 21.

The output circuit 25 amplifies a pixel signal that is supplied from the column signal processing circuit 23 via the data output signal line 34 at a timing in accordance with a driving signal of the horizontal driving circuit 24, and outputs the amplified pixel signal to the signal processing circuit 14 (FIG. 1) in a later stage.

The ramp signal generation circuit 26 generates, as a reference signal that is referred to when the column signal processing circuit 23 A/D-converts a pixel signal, a ramp signal of a voltage that drops with the lapse of time at a fixed gradient (a slope voltage), and supplies the ramp signal to the column signal processing circuit 23.

The control circuit 27 controls the driving of each block in the imaging element 13. For example, the control circuit 27 generates a clock signal in accordance with the driving period of each block, and supplies the clock signal to each block. In the imaging device 11, a sensor output level is supplied to the control circuit 27 from the automatic exposure processing circuit 15 of FIG. 1. The control circuit 27 function as a gain control unit 51 (see FIG. 5 and FIG. 6 described later) that, on the basis of the sensor output level, controls the gain at the time when the column signal processing circuit 23 A/D-converts the pixel signal.

Figure 3:
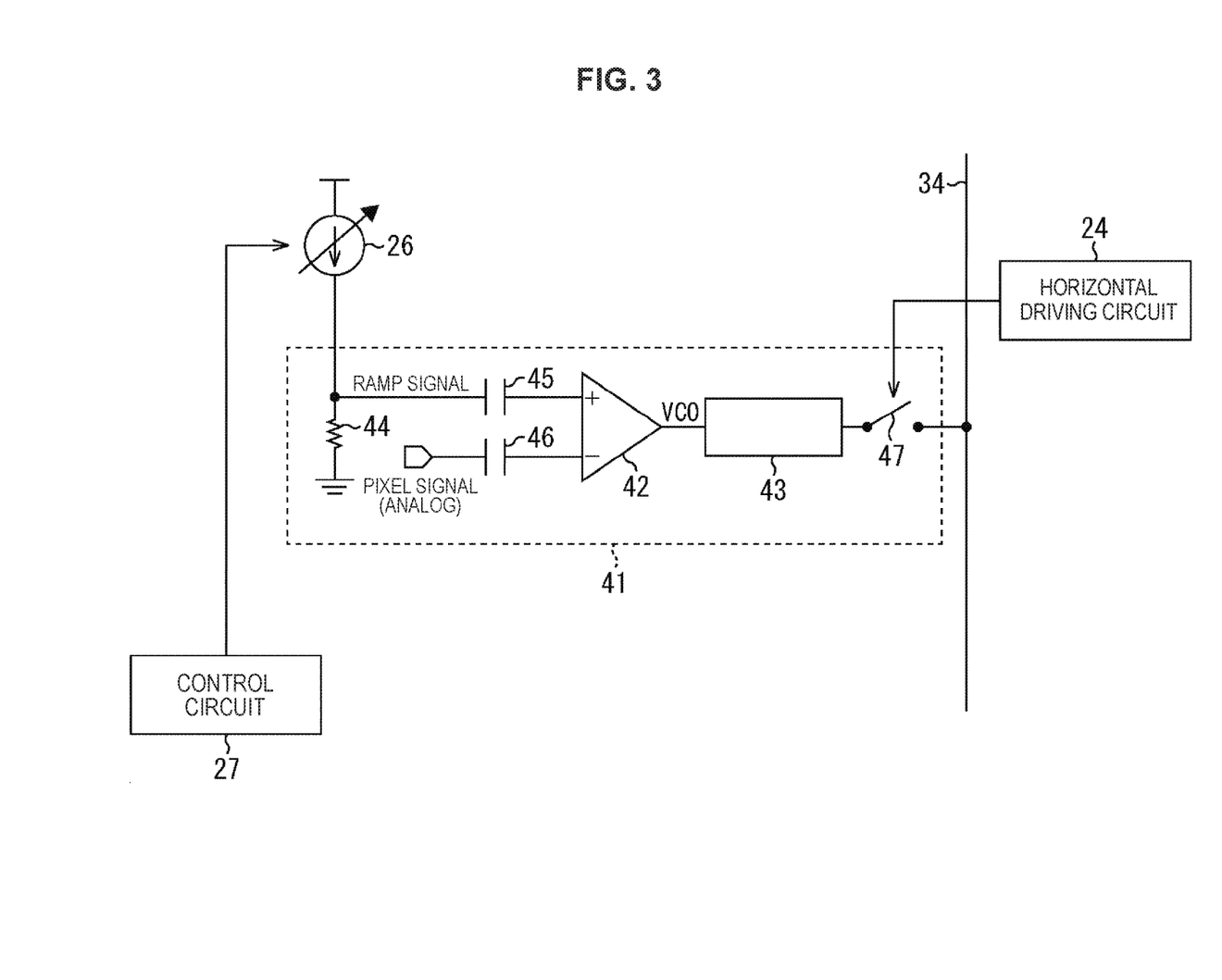
FIG. 3 is a diagram showing an example of the configuration of a column processing unit included in a column signal processing circuit.

Next, in FIG. 3, an example of the configuration of the column processing unit 41 included in the column signal processing circuit 23 is shown.

The column signal processing circuit 23 is configured to include a plurality of column processing units 41 as described above, and one of the column processing units 41 is shown in FIG. 3. The plurality of column processing units 41 are configured similarly, and the illustration thereof is omitted.

As shown in FIG. 3, the column processing unit 41 is configured to include a comparator 42, a counter 43, a resistance 44, capacitors 45 and 46, and a switch 47, and A/D-converts the pixel signal outputted from the pixel.

The input terminal on the plus side of the comparator 42 is connected to the ramp signal generation circuit 26 via the capacitor 45, and the connection point between the capacitor 45 and the ramp signal generation circuit 26 is grounded via the resistance 44. Therefore, an electric potential in accordance with the ramp signal outputted from the ramp signal generation circuit 26 is applied to the input terminal on the plus side of the comparator 42. On the other hand, the input terminal on the minus side of the comparator 42 is connected to the vertical signal line 33 of FIG. 2 via the capacitor 46, and an electric potential in accordance with the analog pixel signal outputted from the pixel 31 is applied to the input terminal on the minus side of the comparator 42.

The output terminal of the comparator 42 is connected to the input of the counter 43, and the output terminal of the counter 43 is connected to the data output signal line 34 via the switch 47. The switch 47 opens and closes in accordance with a driving signal outputted from the horizontal driving circuit 24.

The comparator 42 determines the magnitude between an input signal inputted to the input terminal on the plus side and an input signal inputted to the input terminal on the minus side, and outputs an output signal VCO indicating the determination result. In other words, the comparator 42 determines the magnitude relationship between the electric potential of the ramp signal applied to the input terminal on the plus side and the electric potential of the analog pixel signal outputted from the pixel 31 and applied to the input terminal on the minus side. The comparator 42 outputs an output signal VCO at a high level in the case where the ramp signal is larger than the analog pixel signal, and outputs an output signal VCO at a low level in the case where the ramp signal is equal to or less than the analog pixel signal, for example.

The counter 43 counts a prescribed number of clocks from the timing when the electric potential of the ramp signal supplied from the ramp signal generation circuit 26 starts to drop at a fixed gradient to the timing when the output signal VCO outputted from the comparator 42 switches from a high level to a low level, for example. Therefore, the count value counted by the counter 43 is a value in accordance with the electric potential of the pixel signal inputted to the comparator 42, and thereby the analog pixel signal outputted from the pixel 31 is converted to a digital value.

At the timing of outputting a pixel signal of a column in which a prescribed column processing unit 41 is placed, the switch 47 is closed in accordance with a driving signal outputted from the horizontal driving circuit 24, and the output terminal of the counter 43 is connected to the data output signal line 34. Thereby, a pixel signal converted to a digital value in the column processing unit 41 is outputted to the data output signal line 34.

The column processing unit 41 is configured in this way; the comparator 42 compares the ramp signal in which the electric potential drops at a fixed gradient and the analog pixel signal, and the pixel signal is A/D-converted on the basis of the comparison result. Therefore, the gain at the time when the pixel signal is A/D-converted can be altered by the gradient of the ramp signal; for example, when the gradient of the ramp signal is gentle, the amplification factor is large (a high gain); and when the gradient of the ramp signal is steep, the amplification factor is small (a low gain).

The relationship between the gradient of the ramp signal and the gain of the pixel signal will now be described with reference to FIG. 4.

Figure 4:
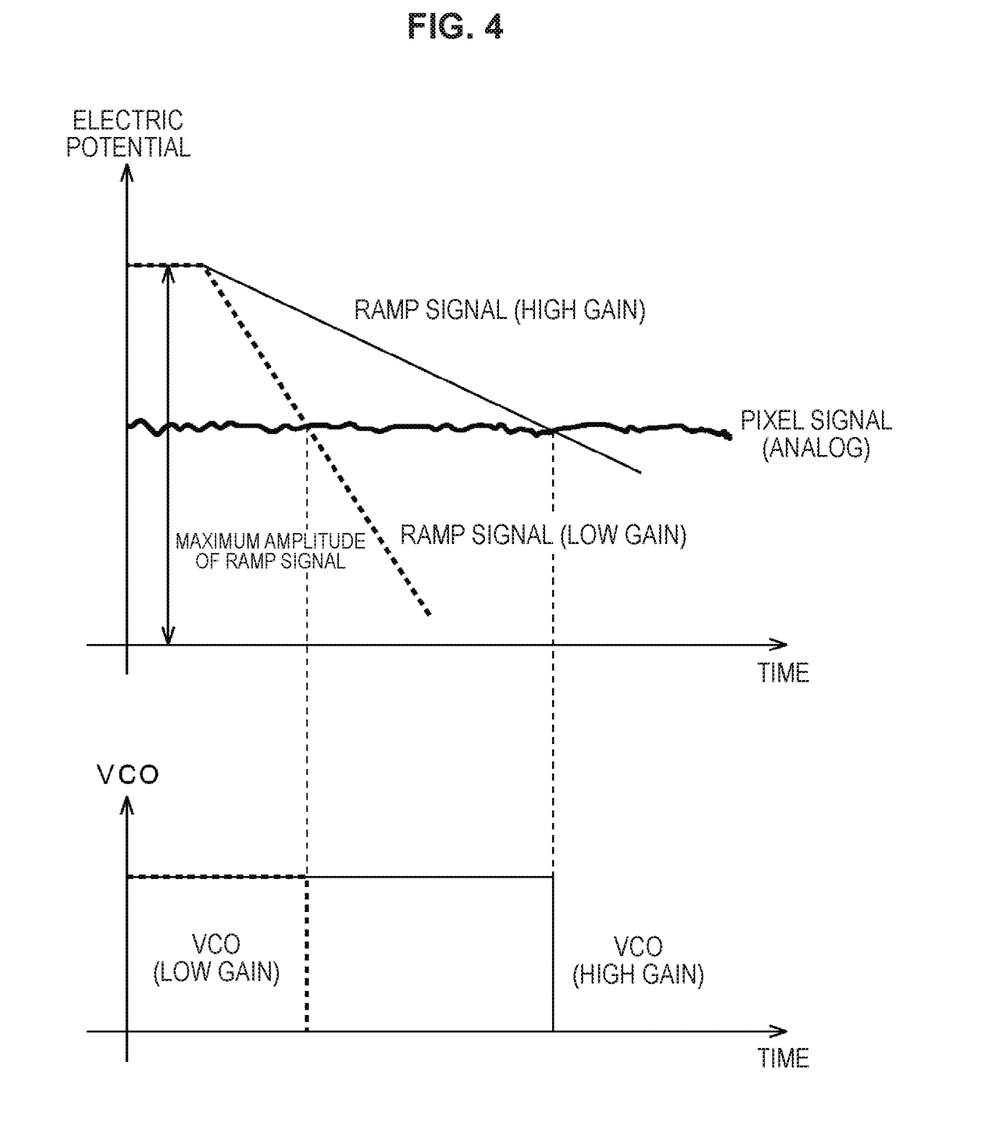
FIG. 4 is a diagram describing the relationship between the gradient of the ramp signal and the gain of the pixel signal.

On the upper side of FIG. 4, the changes of the electric potentials of ramp signals and a pixel signal are shown; and on the lower side of FIG. 4, the timings when the output signal VCO outputted from the comparator 42 switches from a high level to a low level are shown.

As shown in FIG. 4, when the gradient of the ramp signal is steep with respect to a certain level of analog (some noise being included) pixel signal as shown by the broken line, the timing when the output signal VCO switches from a high level to a low level is early. Therefore, the count value in the counter 43 is small, and the gain at the time of A/D-converting the pixel signal is a low gain.

On the other hand, when the gradient of the ramp signal is gentle with respect to a certain level of analog pixel signal as shown by the solid line, the timing when the output signal VCO switches from a high level to a low level is late. Therefore, the count value in the counter 43 is large, and the gain at the time of A/D-converting the pixel signal is a high gain.

Thus, in the imaging device 11, the gain at the time of A/D-converting the pixel signal can be changed by changing the gradient of the ramp signal generated by the ramp signal generation circuit 26.

To generate such a ramp signal, it is necessary to make variable the amount of current outputted from the ramp signal generation circuit 26. Hence, conventionally, a configuration in which the amount of current flowing per constant current source is changed is used in order to make the amount of current variable, and it is required for the constant current source to operate in the saturation region at all times regardless of the amount of current flowing. Thus, in order to achieve a wide gain range and make the maximum amplitude of the ramp signal a high amplitude, it is necessary to increase the power supply voltage, and consequently power consumption has been increased.

In contrast, in the imaging device 11, a configuration in which not only is the amount of current flowing per constant current source changed but also the number of constant current sources itself is made variable is employed. Thereby, the ramp signal generation circuit 26 is configured such that the range in which the amount of current can change can be expanded to achieve a wider gain range and the maximum amplitude of the ramp signal can be made a high amplitude.

Figure 5:
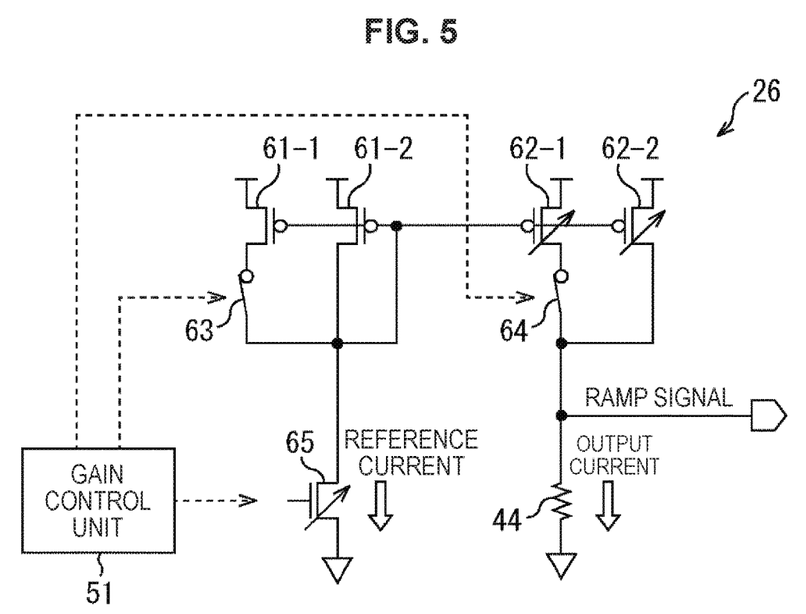
FIG. 5 is a diagram showing an example of the configuration of a ramp signal generation circuit.

Next, an example of the configuration of the ramp signal generation circuit 26 is described with reference to FIG. 5 and FIG. 6. In FIG. 5, the ramp signal generation circuit 26 at the time of a low gain is shown; and in FIG. 6, the ramp signal generation circuit 26 at the time of a high gain is shown.

Figure 6:
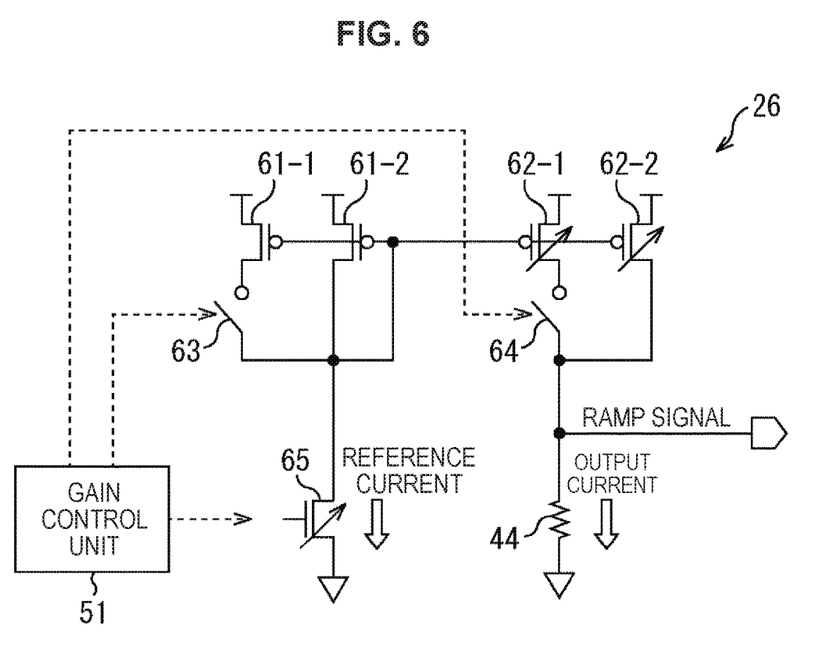
FIG. 6 is a diagram showing the example of the configuration of the ramp signal generation circuit.

As shown in FIG. 5 and FIG. 6, the ramp signal generation circuit 26 is configured to include input-side transistors 61-1 and 61-2, output-side transistors 62-1 and 62-2, switches 63 and 64, and a current source transistor 65. The switch 63, the switch 64, and the current source transistor 65 are controlled by a gain control unit 51 that is included as a function of the control circuit 27.

In the ramp signal generation circuit 26, the two input-side transistors 61-1 and 61-2 and the two output-side transistors 62-1 and 62-2 make a pair to form a current mirror circuit. An output current equal in amount to a reference current flowing through the current source transistor 65 is passed through the resistance 44 in accordance with the control of the gain control unit 51, and thereby a ramp signal is outputted from the ramp signal generation circuit 26.

In the ramp signal generation circuit 26, the input-side transistor 61-1 is connected to the current mirror circuit in accordance with the opening and closing of the switch 63, and the output-side transistor 62-1 is connected to the current mirror circuit in accordance with the opening and closing of the switch 64.

That is, as shown in FIG. 5, at the time of a low gain, the gain control unit 51 makes control so as to close the switch 63 and the switch 64, and the input-side transistor 61-1 and the output-side transistor 62-1 are connected to the current mirror circuit. Thus, the number of transistors connected to the current mirror circuit is increased to increase the output current, and the ramp signal is thus made to have a steep gradient; thereby, the gain at the time when the column processing unit 41 A/D-converts the pixel signal can be made a low gain, as described with reference to FIG. 4.

Further, as shown in FIG. 6, at the time of a high gain, the gain control unit 51 makes control so as to open the switch 63 and the switch 64, and the input-side transistor 61-1 and the output-side transistor 62-1 are not connected to the current mirror circuit. Thus, the number of transistors connected to the current mirror circuit is reduced to reduce the output current, and the ramp signal is thus made to have a gentle gradient; thereby, the gain at the time when the column processing unit 41 A/D-converts the pixel signal can be made a high gain, as described with reference to FIG. 4.

Thus, in the imaging element 13, the gain control unit 51 can switch the gain mode of the column processing unit 41 to a low gain mode or a high gain mode.

That is, when, on the basis of the sensor output level obtained by the automatic exposure processing circuit 15 performing automatic exposure processing, the gain control unit 51 sets the gain at the time when the column processing unit 41 A/D-converts the pixel signal to a low gain, the gain control unit 51 sets the switch 63 and the switch 64 to ON to connect the input-side transistor 61-1 and the output-side transistor 62-1 to the current mirror circuit. By thus increasing the number of transistors included in the current mirror circuit, an excessively large differential voltage is prevented, and the maximum amplitude of the ramp signal, which is the dynamic range of the ramp signal generation circuit 26, is achieved.

On the other hand, when, on the basis of the sensor output level obtained by the automatic exposure processing circuit 15 performing automatic exposure processing, the gain control unit 51 sets the gain at the time when the column processing unit 41 A/D-converts the pixel signal to a high gain, the gain control unit 51 reduces the number of transistors connected to the current mirror circuit; thereby, an excessively small differential voltage is prevented, and the range in which the amount of current can change is expanded.

Figure 7:
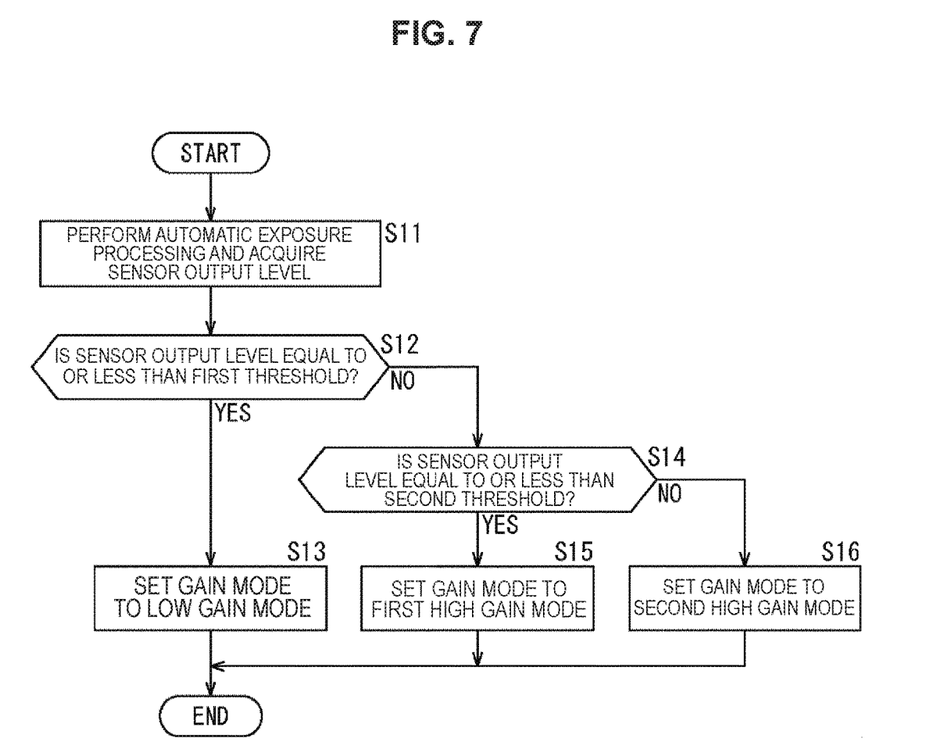
FIG. 7 is a flow chart describing the processing of switching the gain mode of the column processing unit.

Next, FIG. 7 is a flow chart describing the processing of switching the gain mode of the column processing unit 41 by the gain control unit 51.

When, for example, the capture of moving images is started in the imaging device 11 and a prescribed number of frames of images are captured, the processing is started. In step S11, automatic exposure processing is performed in the automatic exposure processing circuit 15 of FIG. 1 to detect the sensor output level, and the gain control unit 51 acquires the sensor output level from the automatic exposure processing circuit 15.

In step S12, the gain control unit 51 determines whether the sensor output level acquired in step S11 is equal to or less than a first threshold A or not. In the case where the gain control unit 51 has determined that the sensor output level is equal to or less than the first threshold A, the processing goes to step S13.

In step S13, the gain control unit 51 sets the gain mode of the column processing unit 41 to a low gain mode. That is, the gain control unit 51 outputs a driving signal that sets the switches 63 and 64 to ON to connect the input-side transistor 61-1 and the output-side transistor 62-1 to the current mirror circuit forming the ramp signal generation circuit 26. Thereby, the amount of current at the time when the ramp signal generation circuit 26 outputs the ramp signal is increased and the ramp signal is made to have a steep gradient; thereby, the gain at the time when the column processing unit 41 A/D-converts the pixel signal is made a low gain. After the processing of step S13, the processing is finished.

On the other hand, in the case where in step S12 the gain control unit 51 has determined that the sensor output level is not equal to or less than the first threshold A (larger than the first threshold A), the processing goes to step S14.

In step S14, the gain control unit 51 determines whether the sensor output level acquired in step S11 is equal to or less than a second threshold B or not. In the case where the gain control unit 51 has determined that the sensor output level is equal to less than the second threshold B, the processing goes to step S15.

In step S15, the gain control unit 51 sets the gain mode of the column processing unit 41 to a first high gain mode. That is, the gain control unit 51 controls the current source transistor 65 so as to reduce the reference current. Thereby, the output current flowing through the resistance 44 by means of the current mirror circuit forming the ramp signal generation circuit 26 is reduced and the ramp signal is made to have a gentle gradient; thereby, the gain at the time when the column processing unit 41 A/D-converts the pixel signal is made a high gain. After the processing of step S15 the processing is finished.

On the other hand, in the case where in step S14 the gain control unit 51 has determined that the sensor output level is not equal to or less than the second threshold B (larger than the second threshold B), the processing goes to step S16.

In step S16, the gain control unit 51 sets the gain mode of the column processing unit 41 to a second high gain mode (a gain even higher than the first high gain mode in step S15). That is, the gain control unit 51 controls the current source transistor 65 so as to reduce the reference current, and furthermore outputs a driving signal that sets the switches 63 and 64 to OFF. Thereby, the number of transistors connected to the current mirror circuit forming the ramp signal generation circuit 26 can be reduced, and therefore the output current flowing through the resistance 44 by means of the current mirror circuit forming the ramp signal generation circuit 26 can be further reduced. Therefore, the ramp signal is made to have an even gentler gradient than that in the first high gain mode, and thereby the gain at the time when the column processing unit 41 A/D-converts the pixel signal is made an even higher gain. After the processing of step S16, the processing is finished.

Thus, in the imaging element 13, the gain control unit 51 controls the number of transistors connected to the current mirror circuit forming the ramp signal generation circuit 26 and controls the reference current flowing through the current source transistor 65; thereby, the gain at the time when the column processing unit 41 A/D-converts the pixel signal can be switched. Thus, in the imaging element 13, the gain range and the dynamic range, which is the maximum amplitude of the waveform of the ramp signal, can be expanded without increasing the power supply voltage. Therefore, in the imaging device 11, an image with a high image quality or a high dynamic range can be captured with lower power consumption.

Figure 8:
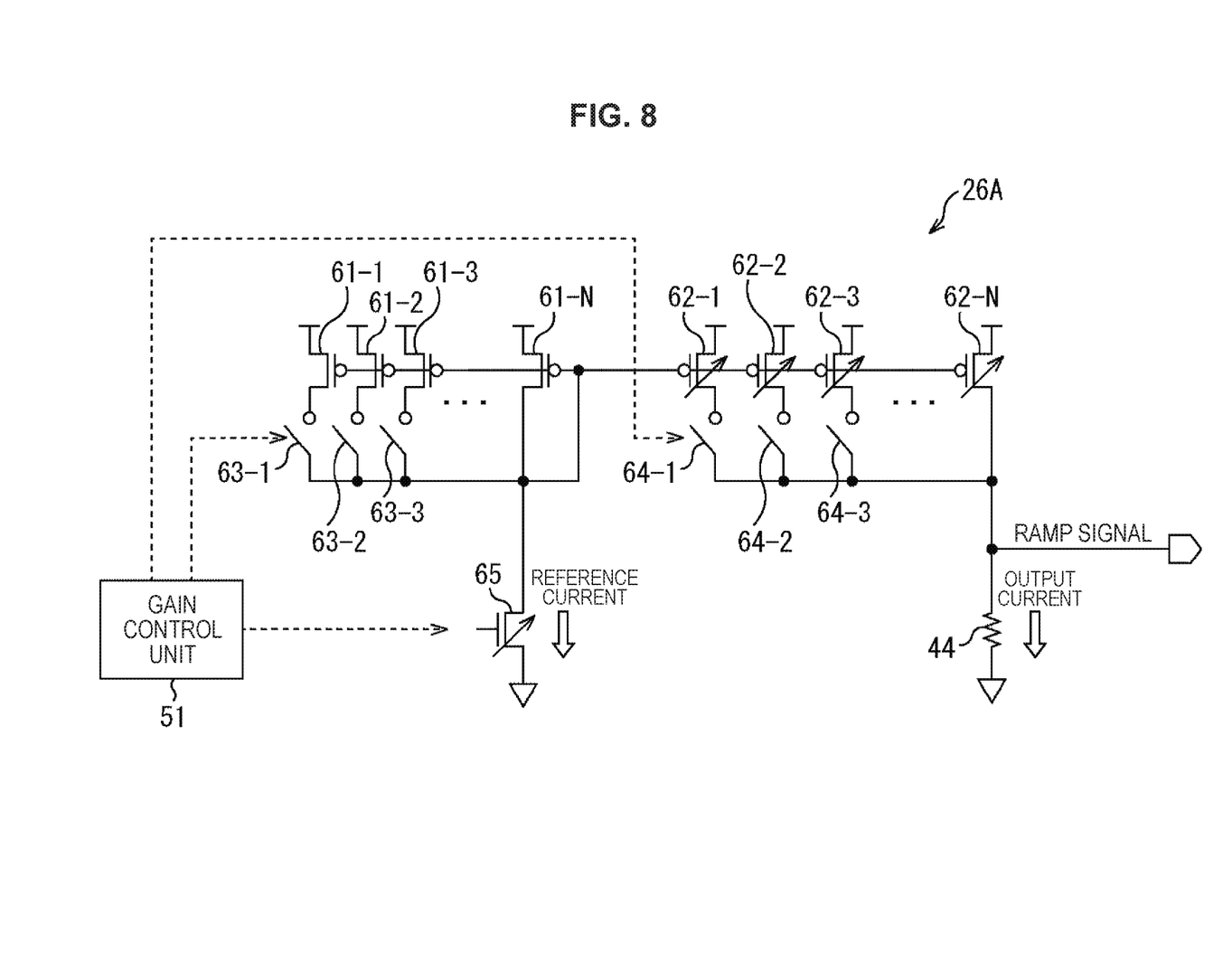
FIG. 8 is a diagram showing a modification example of the ramp signal generation circuit.

Next, FIG. 8 is a diagram showing a modification example of the ramp signal generation circuit.

As shown in FIG. 8, in a ramp signal generation circuit 26A, a current mirror circuit is composed of N input-side transistors 61-1 to 61-1 and N output-side transistors 62-1 to 62-N. The number of transistors connected to the current mirror circuit is switched by N−1 switches 63-1 to 63-(N−1) and N−1 switches 64-1 to 64-(N−1).

In the ramp signal generation circuit 26A thus configured, the gain at the time when the column processing unit 41 A/D-converts the pixel signal can be switched more finely. That is, in the ramp signal generation circuit 26 of FIG. 5 switching is made between two levels of a high gain and a low gain, whereas in the ramp signal generation circuit 26A the gain can be switched between N levels.

Each processing described with reference to the flow chart described above does not necessarily need to be performed on a time-series basis in conformity with the sequence described as a flow chart, and also processing executed in parallel or individually (for example, parallel processing or processing based on the object) may be included. The program may be one to be executed by one CPU, or one to be executed distributedly by a plurality of CPUs.

The solid state imaging element to which the present technology is applied may be used for, as well as an imaging device like that shown in FIG. 1, various electronic devices having an imaging function, such as a mobile phone having an imaging function and what is called a smartphone.

Additionally, the present technology may also be configured as below.

(1)

An imaging element including:

an A/D conversion unit configured to analog-to-digital (A/D)-convert a pixel signal outputted from a pixel; and a reference signal generation unit configured to generate a reference signal that is referred to when the pixel signal is A/D-converted in the A/D conversion unit, wherein the reference signal generation unit includes a prescribed number of pairs of transistors forming a current mirror circuit, and a switching unit configured to switch the number of transistors connected to the current mirror circuit.

(2)

The imaging element according to (1), further including a control unit configured to acquire a brightness of a captured image and control the switching unit so as to reduce the number of transistors connected to the current mirror circuit at a time of, on the basis of the brightness of the image, setting a gain at a time when the pixel signal is A/D-converted by the A/D conversion unit to a high gain.

(3)

The imaging element according to (1) or (2), wherein the control unit controls the switching unit so as to reduce the number of transistors connected to the current mirror circuit and furthermore reduces a reference current of the current mirror circuit.

(4)

A gain control method for an imaging element, the imaging element including an A/D conversion unit configured to analog-to-digital (A/D)-convert a pixel signal outputted from a pixel, and a reference signal generation unit configured to generate a reference signal that is referred to when the pixel signal is A/D-converted in the A/D conversion unit, the reference signal generation unit including a prescribed number of pairs of transistors forming a current mirror circuit, and a switching unit configured to switch the number of transistors connected to the current mirror circuit, the gain control method including:

a step of acquiring a brightness of a captured image; and a step of controlling the switching unit so as to reduce the number of transistors connected to the current mirror circuit at a time of, on the basis of the brightness of the image, setting a gain at a time when the pixel signal is A/D-converted by the A/D conversion unit to a high gain.

(5)

A program for causing a computer to execute control of an imaging element, the imaging element including an A/D conversion unit configured to analog-to-digital (A/D)-convert a pixel signal outputted from a pixel, and a reference signal generation unit configured to generate a reference signal that is referred to when the pixel signal is A/D-converted in the A/D conversion unit, the reference signal generation unit including a prescribed number of pairs of transistors forming a current mirror circuit, and a switching unit configured to switch the number of transistors connected to the current mirror circuit, the program being configured to cause a computer to execute processing including:

a step of acquiring a brightness of a captured image; and a step of controlling the switching unit so as to reduce the number of transistors connected to the current mirror circuit at a time of, on the basis of the brightness of the image, setting a gain at a time when the pixel signal is A/D-converted by the A/D conversion unit to a high gain.

(6)

An electronic device including an imaging element, the imaging element including an A/D conversion unit configured to analog-to-digital (A/D)-convert a pixel signal outputted from a pixel, and a reference signal generation unit configured to generate a reference signal that is referred to when the pixel signal is A/D-converted in the A/D conversion unit, the reference signal generation unit including a prescribed number of pairs of transistors forming a current mirror circuit, and a switching unit configured to switch the number of transistors connected to the current mirror circuit.

The embodiment is not limited to the embodiments described above, and various alterations are possible without departing from the spirit of the present disclosure.

REFERENCE SIGNS LIST 11 imaging device
12 optical system
13 imaging element
14 signal processing circuit
15 automatic exposure processing circuit
16 display unit
17 memory unit
21 pixel area
22 vertical driving circuit
23 column signal processing circuit
24 horizontal driving circuit
25 output circuit
26 ramp signal generation circuit
27 control circuit
31 pixel
32 horizontal signal line
33 vertical signal line
34 data output signal line
41 column processing unit
42 comparator
43 counter
44 resistance
45 and 46 capacitor
47 switch
51 gain control unit

What is claimed is:

1. An imaging element comprising:

an A/D conversion unit configured to analog-to-digital (A/D)-convert a pixel signal outputted from a pixel;

a reference signal generation unit configured to generate a reference signal that is referred to when the pixel signal is A/D-converted in the A/D conversion unit, wherein the reference signal generation unit includes:

a prescribed number of pairs of transistors forming a current mirror circuit, and a switching unit configured to switch the number of transistors connected to the current mirror circuit; and a control unit configured to acquire a brightness of a captured image and control the switching unit so as to reduce the number of transistors connected to the current mirror circuit at a time of, on the basis of the brightness of the image, setting a gain at a time when the pixel signal is A/D-converted by the A/D conversion unit to a high gain.

2. The imaging element according to claim 1, wherein the control unit controls the switching unit so as to reduce the number of transistors connected to the current mirror circuit and furthermore reduces a reference current of the current mirror circuit.

3. A gain control method for an imaging element, the imaging element including an A/D conversion unit configured to analog-to-digital (A/D)-convert a pixel signal outputted from a pixel, and a reference signal generation unit configured to generate a reference signal that is referred to when the pixel signal is A/D-converted in the A/D conversion unit, the reference signal generation unit including a prescribed number of pairs of transistors forming a current mirror circuit, and a switching unit configured to switch the number of transistors connected to the current mirror circuit, the gain control method comprising:

a step of acquiring a brightness of a captured image; and a step of controlling the switching unit so as to reduce the number of transistors connected to the current mirror circuit at a time of, on the basis of the brightness of the image, setting a gain at a time when the pixel signal is A/D-converted by the A/D conversion unit to a high gain.

4. A non-transitory medium for storing a program, the program for causing a computer to execute control of an imaging element, the imaging element including:

an A/D conversion unit configured to analog-to-digital (A/D)-convert a pixel signal outputted from a pixel; and a reference signal generation unit configured to generate a reference signal that is referred to when the pixel signal is A/D-converted in the A/D conversion unit, the reference signal generation unit including:

a prescribed number of pairs of transistors forming a current mirror circuit; and a switching unit configured to switch the number of transistors connected to the current mirror circuit, the program being configured to cause a computer to execute processing including:

a step of acquiring a brightness of a captured image; and a step of controlling the switching unit so as to reduce the number of transistors connected to the current mirror circuit at a time of, on the basis of the brightness of the image, setting a gain at a time when the pixel signal is A/D-converted by the A/D conversion unit to a high gain.

5. An electronic device comprising an imaging element, the imaging element including:

an A/D conversion unit configured to analog-to-digital (A/D)-convert a pixel signal outputted from a pixel;

a reference signal generation unit configured to generate a reference signal that is referred to when the pixel signal is A/D-converted in the A/D conversion unit,
the reference signal generation unit including:
   a prescribed number of pairs of transistors forming a current mirror circuit and
   a switching unit configured to switch the number of transistors connected to the current mirror circuit; and
a control unit configured to acquire a brightness of a captured image and control the switching unit so as to reduce the number of transistors connected to the current mirror circuit at a time of, on the basis of the brightness of the image, setting a gain at a time when the pixel signal is A/D-converted by the A/D conversion unit to a high gain.

* * * * *